United States Patent
Bottari et al.

(10) Patent No.: US 9,584,217 B2
(45) Date of Patent: Feb. 28, 2017

(54) DETERMINING PROPERTIES OF AN OPTICAL COMMUNICATIONS PATH IN AN OPTICAL COMMUNICATIONS NETWORK

(75) Inventors: Giulio Bottari, Leghorn (IT); Stefano Ruffini, Rome (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/401,106

(22) PCT Filed: Jun. 19, 2012

(86) PCT No.: PCT/EP2012/061690
§ 371 (c)(1),
(2), (4) Date: Nov. 13, 2014

(87) PCT Pub. No.: WO2013/170910
PCT Pub. Date: Nov. 21, 2013

(65) Prior Publication Data
US 2015/0104167 A1  Apr. 16, 2015

(30) Foreign Application Priority Data
May 16, 2012  (EP) .................................... 12168307

(51) Int. Cl.
*H04B 10/077* (2013.01)
*H04B 10/2513* (2013.01)
*H04J 3/06* (2006.01)

(52) U.S. Cl.
CPC ..... *H04B 10/0775* (2013.01); *H04B 10/2513* (2013.01); *H04J 3/0661* (2013.01); *H04J 3/0697* (2013.01)

(58) Field of Classification Search
USPC ...................................................... 398/1–38
See application file for complete search history.

(56) References Cited

U.S. PATENT DOCUMENTS 7,454,101 B2 * 11/2008 Jones ................ G02B 6/29352
  385/27
8,184,992 B2 * 5/2012 Kikuchi ................ H04B 10/61
  398/202

(Continued)

FOREIGN PATENT DOCUMENTS

CN   101931469 A   12/2010
CN   102326344 A   1/2012
WO   2012/048975 A1  4/2012

OTHER PUBLICATIONS

U.S. Appl. No. 14/401,106, Bottari et al, Agustin Bello.*
(Continued)

*Primary Examiner* — Agustin Bello
(74) *Attorney, Agent, or Firm* — Leffler Intellectual Property Law, PLLC

(57) ABSTRACT

A method of determining properties of an optical communications path between a first optical network node (A) and a second optical network node (B) determines, at the second optical network node (B), a time difference between respective first and second optical test signals received on different wavelengths ($\lambda1$, $\lambda2$) from the first optical network node. The method also determines, at the second optical network node (B), a real-time chromatic dispersion parameter for each of the wavelengths using a respective coherent receiver at the second optical network node. The method can be used to determine length of the path between the nodes (A, B). The method can be used to determine propagation delay between the nodes (A, B), or asymmetry in propagation delay between the nodes (A, B). Where separate paths are used for forward and reverse transmission directions, measurements can be made of each path.

18 Claims, 14 Drawing Sheets

(56) References Cited

U.S. PATENT DOCUMENTS

| | | | | |
|---|---|---|---|---|
| 8,488,961 | B2* | 7/2013 | Yoshida | G01M 11/336 398/147 |
| 8,600,239 | B2* | 12/2013 | Mani | H04J 3/0667 398/154 |
| 8,842,994 | B2* | 9/2014 | Lanzone | H04J 3/065 370/395.62 |
| 9,264,132 | B2* | 2/2016 | Zampetti | H04B 10/07 |
| 2009/0196615 | A1* | 8/2009 | Kauffman | H04B 10/07951 398/79 |
| 2009/0297140 | A1* | 12/2009 | Heismann | G01M 11/333 398/16 |
| 2011/0158655 | A1* | 6/2011 | Meissner | G01M 11/3145 398/195 |
| 2011/0255874 | A1* | 10/2011 | Watanabe | G02F 1/395 398/178 |
| 2011/0299853 | A1* | 12/2011 | Zampetti | H04J 3/0667 398/98 |
| 2012/0099864 | A1* | 4/2012 | Ishihara | H04B 3/06 398/65 |
| 2013/0077964 | A1* | 3/2013 | Mani | H04J 14/0272 398/34 |
| 2013/0202291 | A1* | 8/2013 | Cavaliere | H04B 10/07 398/33 |
| 2013/0315606 | A1* | 11/2013 | Lanzone | H04L 7/0075 398/154 |
| 2014/0079409 | A1* | 3/2014 | Ruffini | H04J 3/065 398/154 |
| 2014/0199072 | A1* | 7/2014 | Nuijts | H04J 3/0682 398/75 |
| 2015/0104167 | A1* | 4/2015 | Bottari | H04B 10/0775 398/16 |
| 2015/0139663 | A1* | 5/2015 | Lanzone | H04J 3/065 398/154 |
| 2015/0288473 | A1* | 10/2015 | Ruffini | H04J 3/065 398/154 |
| 2016/0105341 | A1* | 4/2016 | Cavaliere | H04B 10/07 398/33 |

OTHER PUBLICATIONS

PCT International Search Report, mailed Feb. 27, 2013, in connection with International Application No. PCT/EP2012/061690, all pages.

Savory, Seb et al. "Electronic compensation of chromatic dispersion using a digital coherent receiver" 2007 Optical Society of America, Optics Express, Mar. 5, 2007, XP055040536, pp. 2120-2126.

Han, Jijo et al. "A Practical Implementation of IEEE 1588-2008 Transparent Clock for Distributed Measurement and Control Systems" IEEE Transactions on Instrumentation and Measurement, IEEE Service Center, Piscataway, NJ, US, vol. 59, No. 2, Feb. 1, 2010, pp. 433-439, XP011282653, ISSN: 0018-9456.

Chi, Hao et al. "Fiber chromatic dispersion measurement based on wavelength-to-time mapping using a femtosecond pulse laser and an optical comb filter" Optics Communications, North-Holland Publishing Co.,Amsterdam, NL, vol. 280, No. 2, Oct. 25, 2007, pp. 337-342, XP022314996, ISSN: 0030-4018.

IEEE 1588-2008 Standard for a Precision Clock Synchronization Protocol for Network Measurement and Control System, IEEE Instrumentation and Measurement Society, Jul. 24, 2008, pp. 1-289.

Kuschnerov, M. et al. "DSP for Coherent Single-Carrier Receivers" Journal of Lightwave Technology, vol. 27, No. 16, Aug. 15, 2009, IEEE, pp. 3614-3622.

CPRI Specification V6.0, Common Public Radio Interface (CPRI); Interface Specification, Aug. 30, 2013; 2013 Ericsson AB, Huawei Technologies Co. Ltd, NEC Corporation, Alcatel Lucent and Nokia Siemens Networks GmbH & Co. KG, pp. 1-128.

Mills, D. et al. "Network Time Protocol Version 4: Protocol and Algorithms Specification" RFC 5905, IETF Trust, Jun. 2010, ISSN: 2070-1721, pp. 1-110.

Li, Han "Test and Analysis of Time Synchronization Using 1588v2 for Transport Network" China Mobile, Colorado, USA, Mar. 2010, pp. 1-30.

ITU-T Standard G.8271/Y.1366 "Time and phase synchronization aspects of packet networks" Feb. 2012, pp. 1-32.

ITU-T Standard G.8271/Y.1366 "Time and phase synchronization aspects of packet networks" Amendment 1, Aug. 2013, pp. 1-12.

Chinese Office Action issued Mar. 25, 2016, in connection with Chinese Application No. 201280073202.8, 9 pages.

English translation of Chinese Office Action issued Mar. 25, 2016, in connection with Chinese Application No. 201280073202.8, part 1, 4 pages.

English translation of Chinese Office Action issued Mar. 25, 2016, in connection with Chinese Application No. 201280073202.8, part 2, 10 pages.

English translation of Chinese Office Action issued Mar. 25, 2016, in connection with Chinese Application No. 201280073202.8, part 3, 3 pages.

* cited by examiner

DETERMINING PROPERTIES OF AN OPTICAL COMMUNICATIONS PATH IN AN OPTICAL COMMUNICATIONS NETWORK

CROSS-REFERENCE TO RELATED APPLICATIONS

This application claims priority under 35 U.S.C. §119 to European Patent Application No. 12168307.2, filed May 16, 2012, which is hereby incorporated herein by reference in its entirety.

TECHNICAL FIELD

This invention relates to determining properties of an optical communications path in an optical communications network which can be used, for example, in determining an asymmetry parameter of the optical communications network. The asymmetry parameter can be used when performing time synchronisation over an optical communications network.

BACKGROUND

There are a number of applications requiring accurate frequency and/or time synchronisation references in order to properly operate, for example mobile technologies such as Global System for Mobile Communication (GSM), Wideband Code Division Multiple Access (W-CDMA) and Long Term Evolution (LTE). In case of frequency synchronisation the traditional solution is to get synchronisation from a synchronous stream of data, as for instance in case of Time-Division Multiplexed (TDM) based networks, but the migration of networks from TDM to packet-based technologies (such as Ethernet) requires a different approach.

One solution is to use a packet based method, where the timing is carried across a packet network by sending packets containing timestamp information. The timestamps are generated by a master (server) that has access to an accurate reference, such as Global Positioning System (GPS).

It is possible to provide time synchronisation between a pair of nodes by using a timing protocol such as the Network Time Protocol (NTP) or Precision Time Protocol (PTP), defined in IEEE 1588. A master node with access to an accurate time source (e.g. GPS) provides a timestamp and the protocol determines the transfer delay between the master node and the slave node. One fundamental assumption with this approach is that the delay from master to slave and from slave to master shall be identical. This means that any asymmetry in the network would significantly impact the performance of the delivered time synchronisation reference.

If the delay asymmetry of the path connected to the ingress port is known, the corrections can be made as specified by the PTP protocol. In particular IEEE 1588 defines an attribute "delayAsymmetry".

In order to handle the packet delay variation and the asymmetries in the network the "Boundary Clock" or "Transparent Clock" functions have been specified by IEEE 1588. The IEEE 1588 transparent clock is a function that provides a means of measuring the delay that has been added by the network element and of measuring the delays on links connected to the network element. The end-equipment can use this information to recover the time reference. The boundary clock, by contrast, terminates and regenerates timestamp packets. While any asymmetry in the node is effectively removed by means of the HW timestamping at the ingress and egress ports, still asymmetries may be present in the links connecting two nodes.

This may happen in case of forward and reverse traffic (and therefore PTP flow) in the same fibre but over different wavelength (e.g. WDM-PON) or in case of forward and reverse traffic in two different fibres (and using the same wavelength), where the fibres may have different transmission characteristics and different lengths.

A known solution to correct for asymmetries in the links is to manually calibrate the links. If the delay asymmetry of the path connected to the ingress port is known, the corrections can be made as specified by the PTP protocol. However, this must be performed node-by-node and can be an extremely costly and time consuming process. Moreover, at any change in the network (e.g. adding transmission equipments) the compensation has to be updated. This can be a too complex and costly task creating a significant obstacle in the deployment of IEEE 1588 technology.

SUMMARY

The present invention seeks to provide an alternative way of determining properties of an optical communications network, such as for use in determining an asymmetry parameter.

An aspect of the present invention provides a method of determining properties of an optical communications path between a first optical network node and a second optical network node. The method comprises determining, at the second optical network node, a time difference between respective first and second optical test signals received on different wavelengths from the first optical network node. The method further comprises determining, at the second optical network node, a real-time chromatic dispersion parameter for each of the wavelengths using a respective coherent receiver at the second optical network node.

An advantage of an embodiment of the invention is that it is possible to determine properties of an optical communications path, such as length of the path, propagation delay of the path and/or asymmetry between forward and reverse paths, without the need for round-trip propagation delay measurements between a pair of nodes. This can simplify the measurement method and can reduce the need for additional apparatus at nodes to support measurement of round-trip propagation delays.

An embodiment of the invention may allow for a convenient implementation of automatic asymmetry compensation.

An embodiment of the invention may use coherent detection hardware which is already provided in a node of the optical communications network.

An embodiment of the invention may be performed without interrupting traffic. The method may be performed periodically to verify the time offset. The method may also be performed to determine the evolution of the fibre life, such as fibre ageing.

Advantageously, the method further comprises determining a length of the optical communications path in a transmission direction from the first optical network node to the second optical network node using the determined time offset and the chromatic dispersion parameters.

Advantageously, the method further comprises determining a propagation delay for the optical communications path between the first optical network node and the second optical network node using the determined time difference and real-time chromatic dispersion parameters.

Advantageously, the method further comprises determining an asymmetry parameter of the optical communications path between the first optical network node and the second optical network node.

Calculation of parameters such as one or more of: length of the optical path; propagation delay for the optical path; an asymmetry parameter (e.g. asymmetry in propagation delay between forward and reverse optical paths) can be performed at the second node, or at another node, such as a node of the Network Management System (NMS).

Another aspect of the invention provides a method of determining properties of an optical communications path between a first optical network node and a second optical network node. The method comprises, at a network management entity, causing the second optical network node to determine a time difference between respective first and second optical test signals received on different wavelengths from the first optical network node. The method further comprises causing the second optical network node to determine a real-time chromatic dispersion parameter for each of the wavelengths using a respective coherent receiver at the second optical network node.

Advantageously, the method further comprises determining at least one of: a propagation delay and an asymmetry parameter for the optical communications path between the first optical network node and the second optical network node using the determined time difference and real-time chromatic dispersion parameters.

Another aspect of the invention provides a method of performing time synchronisation between a master clock at a first node and a slave clock at a second node across an optical communications network. The method comprises, at the second node, using a time protocol to synchronise the slave clock with the master clock using forward and reverse communications between the second node and the first node. The method further comprises, at the second node, compensating for an asymmetry between the forward and reverse communications using an asymmetry parameter which has been determined according to the method of an embodiment of the invention.

Any of the methods can be used in applications which use a time synchronisation protocol such as the Precision Time Protocol (PTP) defined in IEEE1588 or the Network Time Protocol (NTP), or in general delay measurements required in interfaces such as the Common Public Radio Interface (CPRI).

Further aspects of the invention further provide apparatus for implementing any of the described or claimed methods. In particular, an aspect of the invention provides apparatus at a second optical network node for determining properties of an optical communication path between a first optical network node and the second optical network node. The apparatus comprises a time offset measuring module arranged to determine a time difference between respective first and second optical test signals received on different wavelengths from the first optical network node. The apparatus further comprises a dispersion measuring module arranged to determine a real-time chromatic dispersion parameter for each of the wavelengths using a respective coherent receiver at the second optical network node.

Another aspect provides apparatus for use at a network management entity of an optical communication network for determining properties of an optical communication path between a first optical network node and a second optical network node of the network. The apparatus comprises an interface for communicating with the optical network nodes. The apparatus further comprises control logic which is arranged to cause the second optical network node to determine a time difference between respective first and second optical test signals received on different wavelengths from the first optical network node. The control logic is further arranged to cause the second optical network node to determine a real-time chromatic dispersion parameter for each of the wavelengths using a respective coherent receiver at the second optical network node.

Advantageously, the control logic is further arranged to determine at least one of: a propagation delay and an asymmetry parameter for the optical communications path between the first optical network node and the second optical network node using the determined time difference and real-time chromatic dispersion parameters.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory medium. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 1:
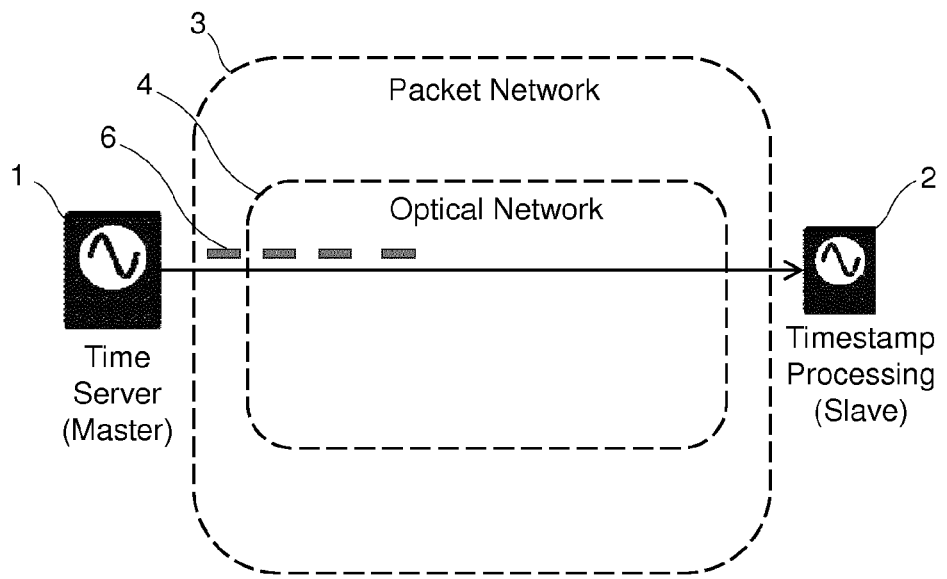
FIG. 1 shows a communication system which includes an optical communications network, with time synchronisation between nodes.

FIG. 1 shows a system in which embodiments of the invention may be used. A first node 1 has a clock which provides an accurate timing reference. The first node 1 may have access to a source of accurate timing information, such as a Global Positioning System (GPS) receiver. A second node 2 has a local clock which is synchronised to the clock of the first node 1. Timing information carried in packets 6 sent between the first node 1 and second node 2 allows the second node 2 to synchronise the local clock at the second node 2 with the clock at the first node 1. A packet network 3, such as an Ethernet network, connects the first node 1 and the second node 2. Timing information can comprise timestamps. Packets are transported across an optical communications network 4 for at least part of the path between the first node 1 and the second node 2. A time protocol such as PTP is used to synchronise a clock at node 2 to a clock at node 1. The time protocol determines an estimate of propagation delay between the master and slave, and assumes that propagation delays in the forward and reverse directions are equal. Node 2 can compensate for any asymmetry between the forward and reverse directions.

Figure 2:
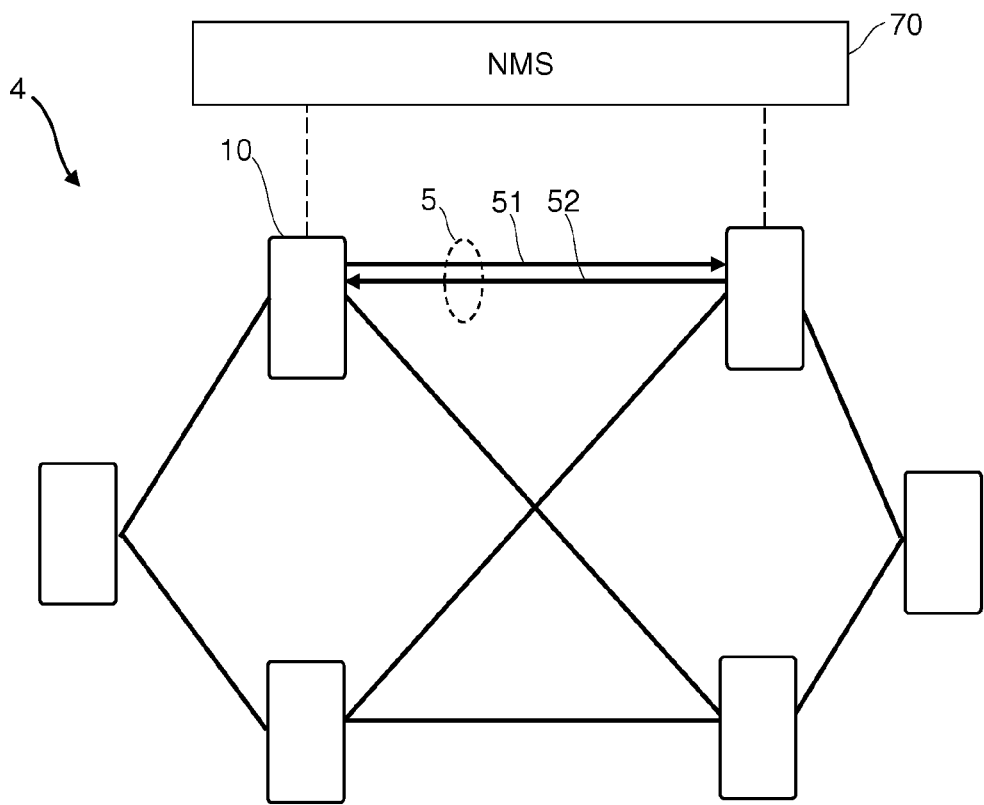
FIG. 2 shows an optical communications network which can form part of the system of FIG. 1.

FIG. 2 shows an example of the optical communications network 4 comprising nodes 10. Adjacent nodes 10 of the network are connected by links 5. A separate link (e.g. optical fibre) 51, 52 can be provided for each direction of communications: a first link 51 for carrying traffic in the forward direction of communications and a second link 52 for carrying traffic in the reverse direction of communications. Each link can be a separate fibre which can follow a physically separate path. Traffic is carried on links 51, 52 by wavelength channels, which are also called lambdas. Each lightpath uses a different wavelength channel within a defined spectral band. This type of network uses a fixed or flexible grid of wavelength division multiplexed (WDM) or densely wavelength division multiplexed (DWDM) optical channels for lightpaths. At the source node and destination node of a lightpath there are optical transceivers for optically transmitting traffic on lambdas and for optically receiving traffic on lambdas. Advantageously, a node comprises an optical cross-connect which is arranged to forward traffic based on wavelength of the lambda. This is generally known as Wavelength Switched Optical Network. The network can have a meshed, ring or any other suitable topology. Network 4 can also comprise a Network Management System (NMS) 70. Nodes 10 communicate with the NMS 70.

Figure 3A:
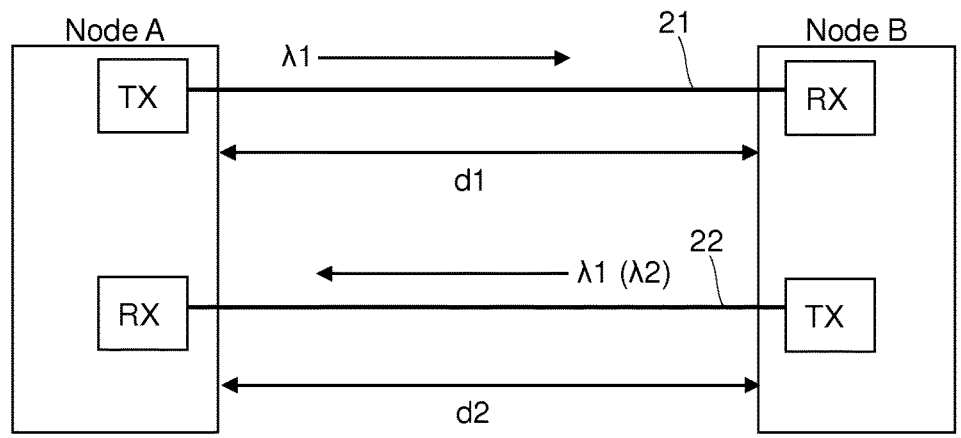
FIG. 3A shows separate optical paths with one or more fibre spans used for forward and reverse transmission directions between a pair of nodes A, B, of the optical communications network of FIG. 2.
Figure 3B:
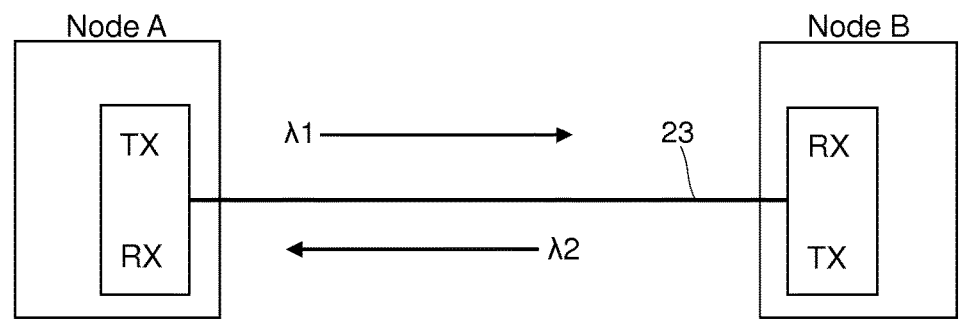
FIG. 3B shows a single optical path with one or more fibre spans used for forward and reverse transmission directions between a pair of nodes A, B, of the optical communications network of FIG. 2.

FIGS. 3A and 3B show two possible ways in which traffic can be carried over the optical communications network 4, between a pair of nodes A, B. In FIG. 3A there are separate optical paths 21, 22 for each direction of communication: a first path 21 for carrying traffic in the forward direction of communication (A-B) and a second path 22 for carrying traffic in the reverse direction of communication (B-A). Each path 21, 22 can comprise one of the links 51, 52 shown in FIG. 2, or a sequence of links 51, 52. Each optical path 21, 22 can be a separate fibre which can follow a physically separate path. The length, d1, of path 21 can be different from the length, d2, of path 22. The same wavelength, λ1, can be used to carry traffic over the paths 21 and 22, or different wavelengths can be used to carry traffic over the paths 21 and 22, such as wavelength λ1 over the path 21 and wavelength λ2 over the path 22.

In FIG. 3B one path 23 is used for both directions of communication. Path 23 can comprise one of the links 51 shown in FIG. 2, or a sequence of links 51. A first wavelength, λ1, is used for carrying traffic in the forward direction of communication (A-B) and a second wavelength, λ2, is used for carrying traffic in the reverse direction of communication (B-A).

The time protocol (e.g. PTP) assumes that path delays in the forward and reverse directions are equal but the optical communications network 4 may cause different path delays in the forward and reverse directions, which can affect time synchronisation. One cause of asymmetry is propagation delay asymmetry. In FIG. 3A, different lengths L1, L2 of the paths 21, 22 can cause a propagation delay asymmetry. If different wavelengths λ1, λ2 are used in FIG. 3A, this can cause a propagation delay asymmetry, even if the physical length of paths 21, 22 is the same. In FIG. 3B, different wavelengths λ1, λ2 used for the forward and reverse directions in the same optical path (e.g. fibre) can cause a propagation delay asymmetry.

Embodiments of the invention provide ways of determining measurements which can be used to determine a propagation delay asymmetry caused by the optical communications network 4.

Figure 4A:
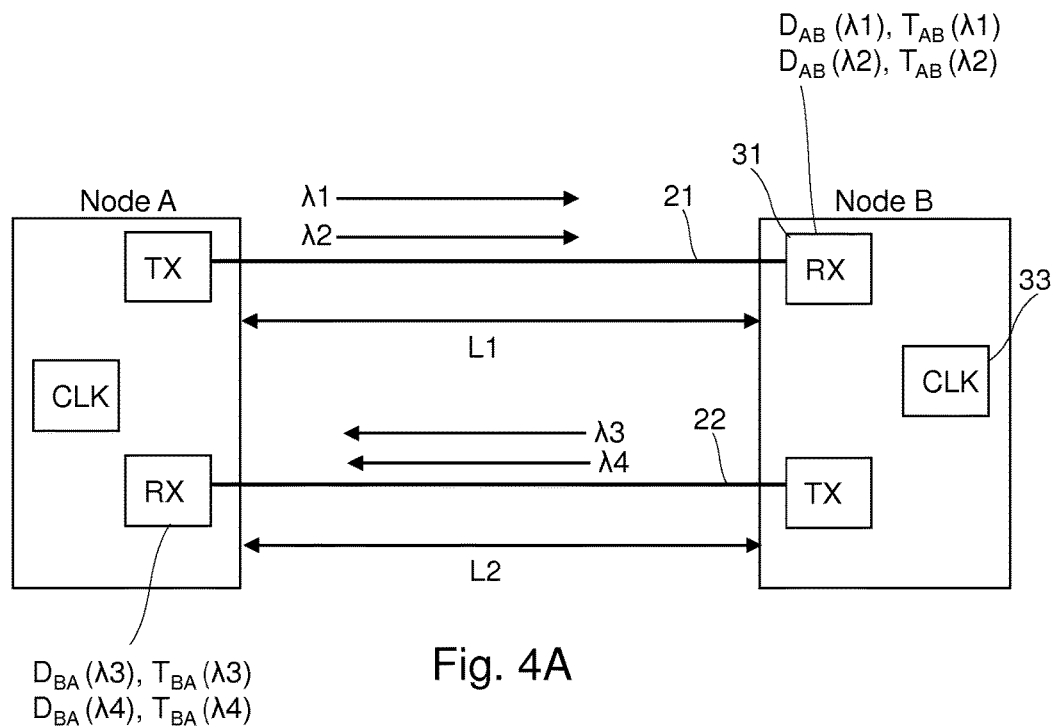
FIGS. 4A, 4B, and 4C show ways of determining asymmetry of the arrangements of FIGS. 3A and 3B.

FIG. 4A shows an arrangement for determining properties of optical paths in the scenario of FIG. 3A where different paths 21, 22 are used for forward and reverse directions of communication. Node A and Node B are shown. Each node can be, for example, a Reconfigurable Optical Add Drop Multiplexer ROADM). Nodes A, B can be adjacent nodes in the network (i.e. nodes at each end of a single fibre span with no intermediate nodes positioned in the transmission path between A and B) but, more generally, Nodes A and B can be any two nodes in the optical communications network 4, with any number of intermediate nodes and/or optical amplifiers positioned in the path between nodes A and B. The receiver RX 31 at each node is a coherent receiver which is capable of coherent detection. An optical signal is detected at a receiver RX 31 using coherent detection.

Each node, in addition to the conventional subsystem for switching and coherent termination, is equipped with a sufficiently accurate clock 33 which is used to measure the arrival times of different wavelengths. The oscillator used in the clock 33 can be relatively cheap, such as a Temperature-compensated crystal oscillator (TCXO) as for this type of measurement it is sufficient that the oscillator is stable over a very short time interval. The clock which is conventionally provided at a node to support coherent transmission can be used.

In accordance with a method according to an embodiment of the invention, two optical signals at different wavelengths: a first signal at wavelength λ1, and a second signal at wavelength λ2, are simultaneously transmitted from node A to node B. As noted above, the signals may pass via intermediate optical amplifiers (OA) which are not shown in FIG. 4A. The wavelengths λ1, λ2 can be standard channel wavelengths from the International Telecommunications Union (ITU-T) Recommendation G.694 WDM or DWDM comb. The optical signals will arrive at node B with a time offset due to Chromatic Dispersion (CD). Clock 33 is used to measure the time offset between the arrival of the two signals. Using the coherent receiver 31 at node B it is possible to determine the value of dispersion parameter at wavelength λ1, $D_{AB}(\lambda 1)$, and at wavelength λ2, $D_{AB}(\lambda 2)$ at node B. Coherent receiver 31 outputs a real-time estimation/ measurement of chromatic dispersion. This means it is an estimation/measurement of the actual chromatic dispersion at the time the measurement is made, rather than a value which is retrieved from a datasheet. The clock 33 is used to determine arrival times $T_{AB}(\lambda 1)$ and $T_{AB}(\lambda 2)$ and hence the time offset between arrival times.

The time offset can be measured by determining a difference in arrival time of a particular data sequence in each of the two signals, such as a predefined sequence of bits which is carried within an OTN frame, assuming that the two sequences have been simultaneously transmitted from the first node A.

Figure 15:
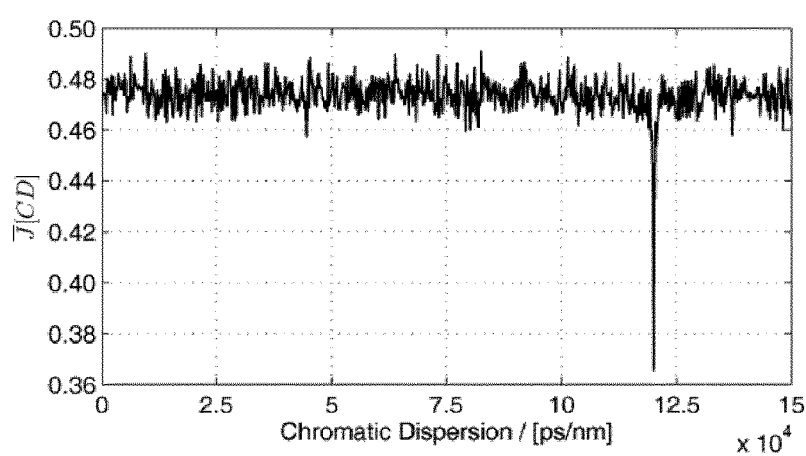
FIG. 15 shows estimation of chromatic dispersion.

There are several possible techniques for determining chromatic dispersion at the coherent receiver. One option is to perform a "blind scan" (i.e. a search without any prior knowledge) that begins with a coarse search to find a minimum peak of an objective function (see, for example, the graph in FIG. 15) and then performs a fine search around the rough dispersion value to find a more accurate value. Another option is to use a stored value as a starting point for the search operation. The stored value can be a theoretical dispersion value (e.g. a value provided by a datasheet of the fibre manufacturer). This can allow a faster convergence to the actual, in field, value and can avoid the need to perform the preliminary coarse search.

A similar method can be performed in the reverse direction, B-A. Two optical signals at different wavelengths: a first at wavelength $\lambda 3$ and a second at wavelength $\lambda 4$ are simultaneously transmitted from node B to node A. The wavelength $\lambda 3$ can equal $\lambda 1$ and the wavelength $\lambda 4$ can equal $\lambda 2$, although this is not necessary. The optical signals will arrive at node A with a time offset due to Chromatic Dispersion (CD). Clock 33 at node A is used to measure the time offset between the arrival of the two signals. Using the coherent receiver 31 at node A it is possible to determine the value of dispersion parameter at wavelength $\lambda 3$, $D_{BA}(\lambda 3)$, and at wavelength $\lambda 4$, $D_{BA}(\lambda 4)$. The clock 33 is used to determine arrival times $T_{BA}(\lambda 3)$ and $T_{BA}(\lambda 4)$ and hence the time offset between arrival times.

Considering the path 21, having length $L_{AB}$, and assuming that the two channels have been simultaneously transmitted in A, it is possible to define the time offset $\Delta T_{AB}$ at node B as:

$$\Delta T_{AB}=T_{AB}(\lambda 2)-T_{AB}(\lambda 1)=(D_{AB}(\lambda 2)*\lambda 2-D_{AB}(\lambda 1)*\lambda 1)*L_{AB} \quad (i)$$

This formula assumes that the dispersion parameter is positive, as typically occurs in commercial fibres. By rearranging formula (i), the value of $L_{AB}$ can be stated as a function of parameters which are all known or estimated at node B:

$$L_{AB}=(D_{AB}(\lambda 2)*\lambda 2-D_{AB}(\lambda 1)*\lambda 1)/(T_{AB}(\lambda 2)-T_{AB}(\lambda 1)) \quad (ii)$$

With a similar formula, the length $L_{BA}$ of the path 22 can be calculated starting from the values of dispersion and times estimated in node A:

$$L_{BA}=(D_{BA}(\lambda 4)*\lambda 4-D_{BA}(\lambda 3)*\lambda 3)/(T_{BA}(\lambda 4)-T_{BA}(\lambda 3)) \quad (iii)$$

Figure 4B:
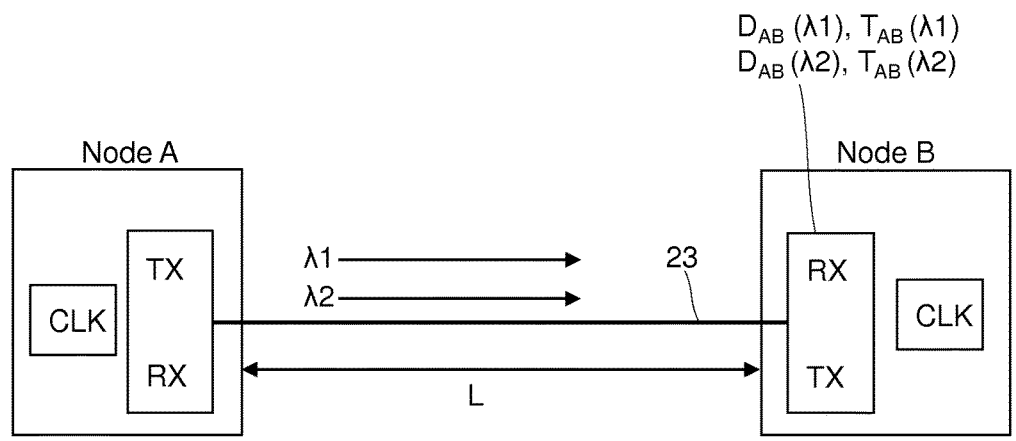

FIG. 4B shows an arrangement for determining properties of optical paths, in the scenario where a single optical path 23 is used for forward and reverse directions of communication. The arrangement is similar to that described for FIG. 4A, but with the simplification that there is only a need to perform measurements in the forward direction A-B, and not in the reverse direction B-A. The measurements performed at node B are sufficient to determine the effective length L of the optical path, and this length is the same in both directions. Propagation delay asymmetry can arise from different wavelengths.

The paths 21, 22, 23 are not limited to point-to-point links, but can be any combination of links/fibre spans between a pair of nodes of the optical communications network 4. In this more general case, the length calculated as above assumes the meaning of an "effective length" between the two nodes. This effective length is a useful parameter because it is the length that the optical signal "sees" travelling between its source and destination and which is usable to estimate (and compensate) the asymmetry between the two directions.

Propagation delay between nodes A and B can be calculated at a particular wavelength by:

$$T_{P\_AB}(\lambda_n)=L_{AB}/v_{AB}(\lambda_n) \quad (iv)$$

where:
$T_{P\_AB}(\lambda_n)$=Propagation delay A-B at wavelength $\lambda_n$
$v_{AB}(\lambda_n)$ is the speed of light in fibre at wavelength $\lambda_n$
$L_{AB}$ is the length of path A-B which is calculated according to eqn. (ii) and $$v_{AB}(\lambda_n)=c/n_{AB}(\lambda_n)$$

with:
c=speed of light in vacuum
$n_{AB}(\lambda_n)$=refractive index of fibre at wavelength $\lambda_n$
The same formulas apply for direction B-A:

$$T_{P\_BA}(\lambda_n)=L_{BA}/v_{BA}(\lambda_n) \quad (iv)$$

where:
$T_{P\_BA}(\lambda_n)$=Propagation delay B-A at wavelength $\lambda_n$
$v_{BA}(\lambda_n)$ is the speed of light in fibre at wavelength $\lambda_n$
$L_{BA}$ is the length of path B-A which is calculated according to eqn. (iii) and $$v_{BA}(\lambda_n)=c/n_{BA}(\lambda_n)$$

with:
c=speed of light in vacuum
$n_{BA}(\lambda_n)$=refractive index of fibre at wavelength $\lambda_n$
The propagation delay asymmetry, A, for a wavelength $\lambda_n$ is:

$$A =_{AB}(\lambda_n) - T_{BA}(\lambda_n) = [L_{AB}/v_{AB}(\lambda_n)] - [L_{BA}/v_{BA}(\lambda_n)] \quad (v)$$
$$= c*([L_{AB}/n_{AB}(\lambda_n)] - [L_{BA}/n_{BA}(\lambda_n)])$$

The refractive index, at the various values of $\lambda_n$, can be obtained by reverting the formula which links chromatic dispersion and refractive index:

$$D = -\frac{\lambda}{c}\frac{d^2 n}{d\lambda^2}. \quad (vi)$$

Where D represents one of the quantities $D_{AB}(\lambda n)$, $D_{BA}(\lambda n)$ and n represents one of the quantities $n_{AB}(\lambda_n)$, $n_{BA}(\lambda_n)$, and depends on $\lambda_n$.

Figure 4C:
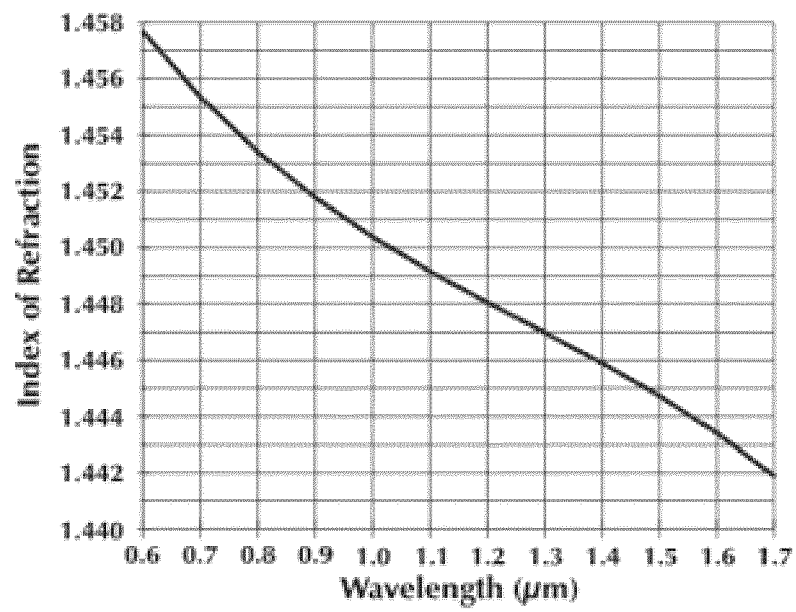

In order to revert this formula multiple values of D, at multiple values of lambda, are required. Note that this formula could be implemented directly in the DSP of the coherent receiver (31, FIGS. 4A, 4B) to obtain the estimated value of n for each $\lambda_n$. As an alternative the fibre data sheet of the fibre can be used (an example is shown in FIG. 4C) to retrieve a theoretical value of n. This method however is less accurate because current values can deviate over time.

The propagation delay asymmetry, A, for a wavelength $\lambda_m$ used in the forward direction and a wavelength $\lambda_n$ used in the reverse direction is:

$$A = T_{P\_AB}(\lambda_m) - T_{P\_BA}(\lambda_n) = L_{AB}/v_{AB}(\lambda_m) - L_{BA}/v_{BA}(\lambda_n) \quad \text{(vii)}$$
$$= c * (L_{AB}/n_{AB}(\lambda_m) - L_{BA}/n_{BA}(\lambda_n))$$

Equations (v) and (vii) shows asymmetry solely due to difference in propagation delays of forward and reverse paths. Propagation delay is one of a number of possible causes of asymmetry between forward and reverse paths. Additional causes of asymmetry include: delay arising from mapping data into packets at a border node and delay due to Forward Error Correction (FEC). Additional causes of delay can be determined and added to the delay due to propagation in fibre. The device or method used to mitigate the effect of asymmetry could compensate the total asymmetry, due to propagation delay and one or more of the additional causes of delay.

One advantage of the method is to provide an extremely accurate computation of the fibre length $L_{AB}$ (and $L_{BA}$ in the two fibres case), with a final goal of computing the asymmetry A. This fibre length is independent of the wavelength. Once the values of $L_{AB}$ and $L_{BA}$ have been calculated, these values are used in equation (iv), (v) or (vii) to estimate the propagation time. In equations (v) and (vii) the dependence on wavelength is contained to the refractive index, as explained above.

The calculations of equations (ii)-(vii) can all be performed at node B, or a combination of node A and node B. Alternatively, node B or node A can perform one or more of equations (ii)-(vii) and then forward the results of these calculations to other nodes, with the other nodes performing calculation of the other equations (ii)-(vii). For example, in a simplest case, node B can forward measurements of time offset and chromatic dispersion to another node (e.g. NMS 70) for calculation of the parameters defined by equations (ii)-(vii). In another example, node B can calculate length using equation (ii) and then forward the calculated length to another node. In another example, node B can calculate length using equation (ii) and propagation delay using equation (iv) and then forward the calculated length and/or propagation delay to another node.

The signals sent from node A to node B at wavelengths $\lambda 1$ and $\lambda 2$, and the signals sent from node B to node A at wavelengths $\lambda 3$ and $\lambda 4$ can be traffic carrying signals, and the estimation of dispersion does not affect the traffic payload of these signals. In the event that there are not two lightpaths at different wavelengths in operation between the nodes A, B, then lightpaths can be established between the nodes A, B to meet this requirement.

Operation of node A and node B can be co-ordinated to perform the process described above, such as by management plane signalling from an NMS or control plane signalling between the nodes. For example, node A can tell node B that it is about to start transmitting the two signals towards node B, and instructs node B to measure difference in arrival times. Alternatively, node B can simply listen for a predefined data sequence carried by the wavelengths terminated in B. Following this event, CD estimation can be activated.

Once measured values are available, it is then possible to automatically insert the relevant time offset compensation, for instance using the Network Management System (NMS), into the IEEE1588 parameters of the node (Transparent Clock, Boundary Clock or Slave clock) in case of PTP or in general to correctly handle any system that requires symmetric channels.

The procedure described above provides measurements about properties of the optical path between two nodes (A, B) of the optical communications network. These measurements are used to derive an estimation of the asymmetry that exists between this pair of nodes. When performing time synchronisation between a pair of nodes, it is possible to compensate for this asymmetry.

Time synchronisation can occur at one, or both, of the nodes A, B involved in the measurements and/or calculations described above. Time synchronisation can occur at another node of the optical communications network 4, or a node of a client network which uses the optical communications network 4. The calculation of asymmetry between a pair of nodes (A, B) is still useful, even where time synchronisation does not occur at one of the nodes (A, B) of the optical communications network.

Figure 5:
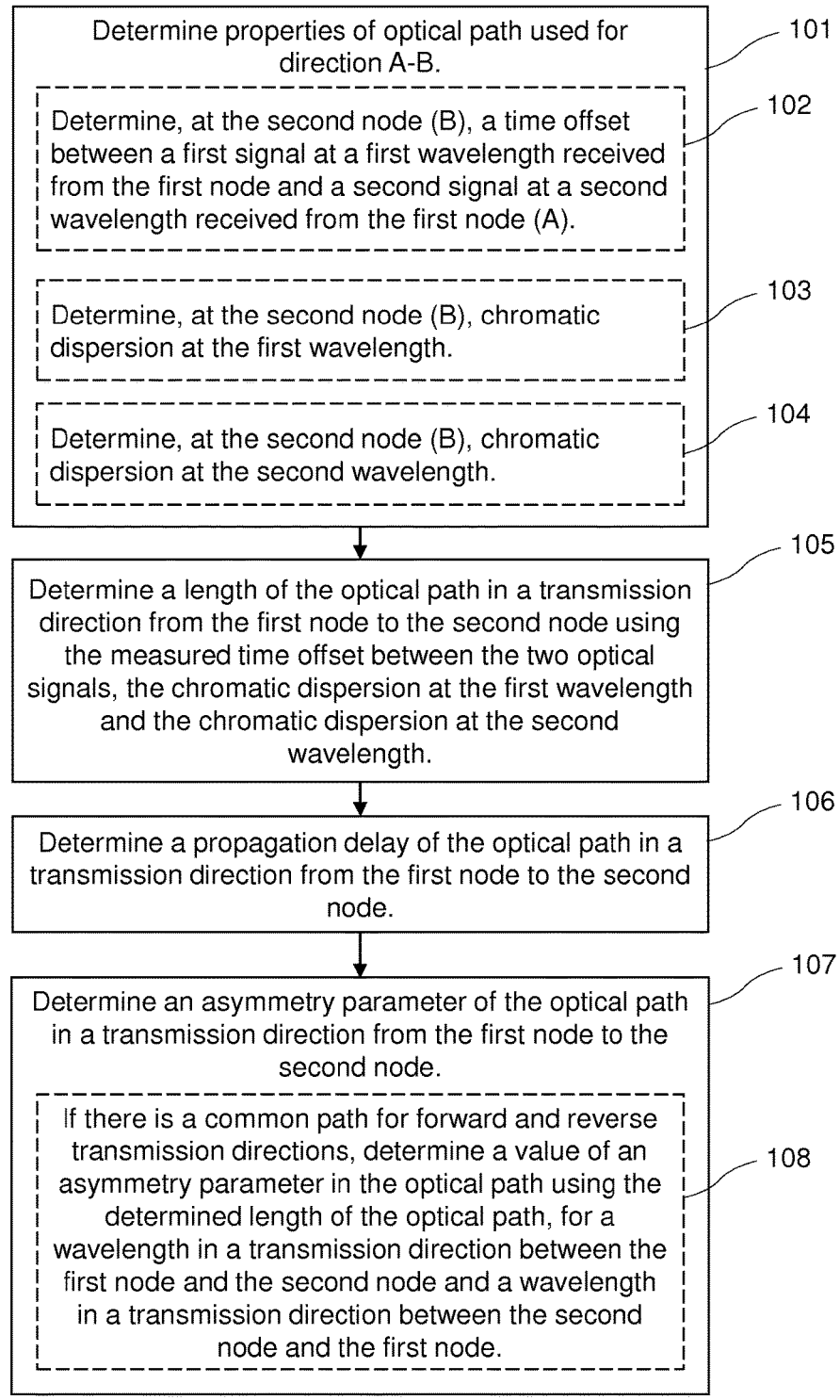
FIGS. 5 and 6 show a method for determining asymmetry of an optical path.
Figure 6:
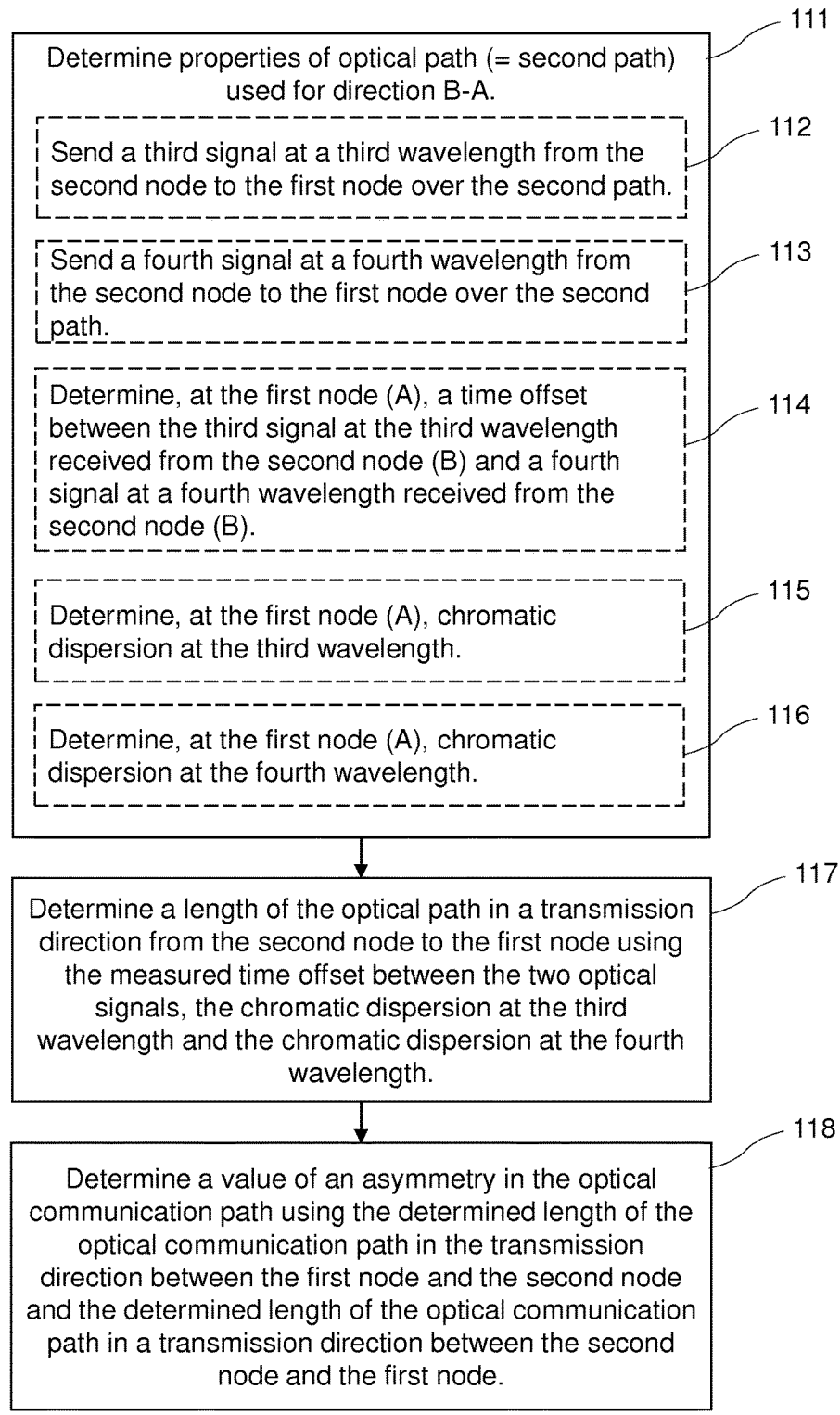

FIG. 5 shows a method which can be performed at node B. In FIGS. 5 and 6, the "first node" is node A and the "second node" is node B. The method begins at step 101 by measuring properties of an optical path used for transmission direction A-B. At step 102, node B determines a time offset between a first signal at a first wavelength received from the first node and a second signal at a second wavelength received from the first node. At step 103, node B determines chromatic dispersion at the first wavelength. At step 104, node B determines chromatic dispersion at the second wavelength. At step 105, the method can comprise a step of determining a length of the optical path in a transmission direction from the first node to the second node using the measured time offset, the chromatic dispersion at the first wavelength and the chromatic dispersion at the second wavelength. Step 105 can be performed at node B. Alternatively, this step may be made at another node, such as the NMS 70. At step 106, the method can comprise a step of determining a propagation delay of the optical path in a transmission direction from the first node to the second node. Step 106 can use the length determined at step 105, and can use equation (iv) described above. Step 106 can be performed at node B. Alternatively, this step may be made at another node, such as the NMS 70. The method can proceed to step 107 to determine an asymmetry parameter, such as a difference in propagation delay between forward and reverse paths. If there is a common path for forward and reverse transmission directions (i.e. the scenario shown in FIGS. 3B, 4B) then the method, at step 108, determines a value of an asymmetry parameter in the optical path using the determined length of the optical path, for a wavelength in a transmission direction between the first node and the second node and a wavelength in a transmission direction between the second node and the first node. Step 106 can be performed at node B. Alternatively, this step may be made at another node, such as the NMS 70.

FIG. 6 shows further steps of a method which can be performed at the nodes A and B. Step 111 measures properties of an optical path (=second path) used for transmission direction B-A. At step 112, node B sends a third signal at a third wavelength from the second node to the first node over the second path. At step 113, node B sends a fourth signal at a fourth wavelength from the second node to the first node over the second path.

At step 114 node A determines a time offset between the third signal at the third wavelength received from the second node (B) and a fourth signal at a fourth wavelength received from the second node (B). At step 115, node A determines chromatic dispersion at the third wavelength. At step 116, node A determines chromatic dispersion at the fourth wavelength. At step 117, the method can comprise a step of determining a length of the optical path in a transmission direction from the second node to the first node using the measured time offset, the chromatic dispersion at the third wavelength and the chromatic dispersion at the fourth wavelength. Step 117 can be performed at node A. Alternatively, this step may be made at another node. For example, measurements may be forwarded to the NMS 70, or to nodes which perform time synchronisation. Alternatively, measurements made at step 111 can be forwarded to node B, and node B can perform the calculation of step 117.

At step 118, the method can determine a value of an asymmetry parameter in the optical path using the determined length of the optical communication path in the transmission direction between the first node and the second node and the determined length of the optical communication path in a transmission direction between the second node and the first node. Step 118 can be performed at node A. Alternatively, this step may be made at another node. For example, measurements may be forwarded to the NMS 70, or to nodes which perform time synchronisation. Alternatively, measurements made at step 118 can be forwarded to node B, and node B can perform the calculation of step 118.

Figure 7:
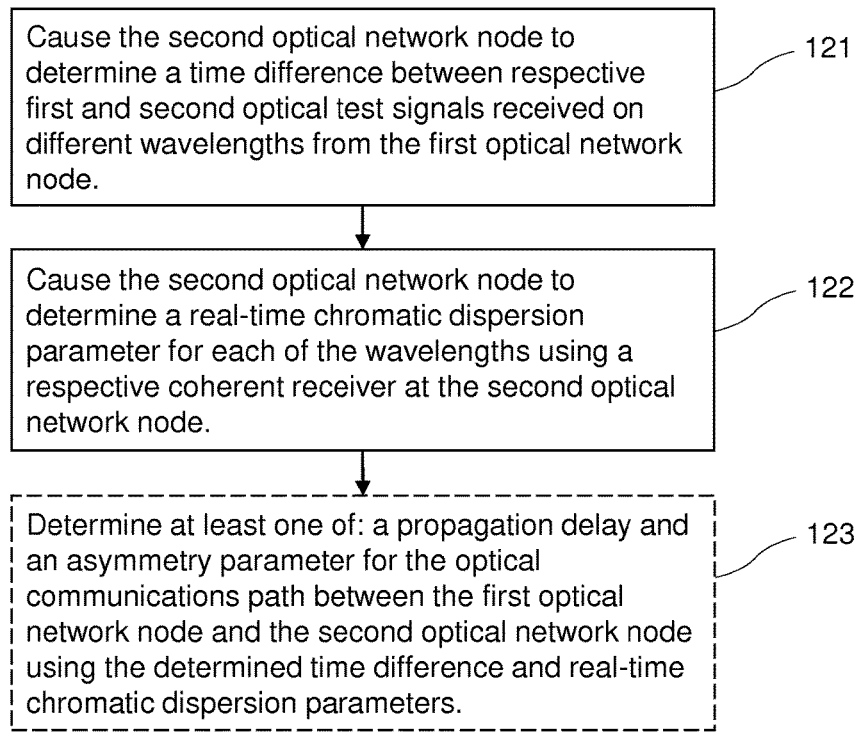
FIG. 7 shows a method performed by a NMS.

FIG. 7 shows a method which can be performed by a NMS entity 70. At step 121 the NMS causes the second optical network node to determine a time difference between respective first and second optical test signals received on different wavelengths from the first optical network node. At step 122 the NMS causes the second optical network node to determine a real-time chromatic dispersion parameter for each of the wavelengths using a respective coherent receiver at the second optical network node. Optionally, at step 123 the NMS can determine at least one of: a propagation delay and an asymmetry parameter for the optical communications path between the first optical network node and the second optical network node using the determined time difference and real-time chromatic dispersion parameters.

Figure 8:
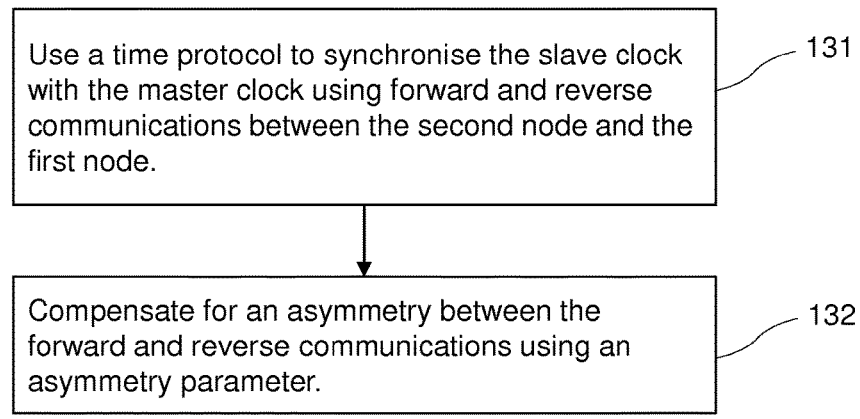
FIG. 8 shows a method of synchronising a slave node with a master node.

FIG. 8 shows a method of synchronising a slave clock at a slave node with a master clock at a master node. At step 131 the slave node uses a time protocol to synchronise the slave clock with the master clock using forward and reverse communications between the second node and the first node. At step 132 the slave node compensates for an asymmetry between the forward and reverse communications using an asymmetry parameter. The asymmetry parameter may be calculated locally at the slave node, or it can be calculated by another node in the network, such as NMS 70.

Figure 9:
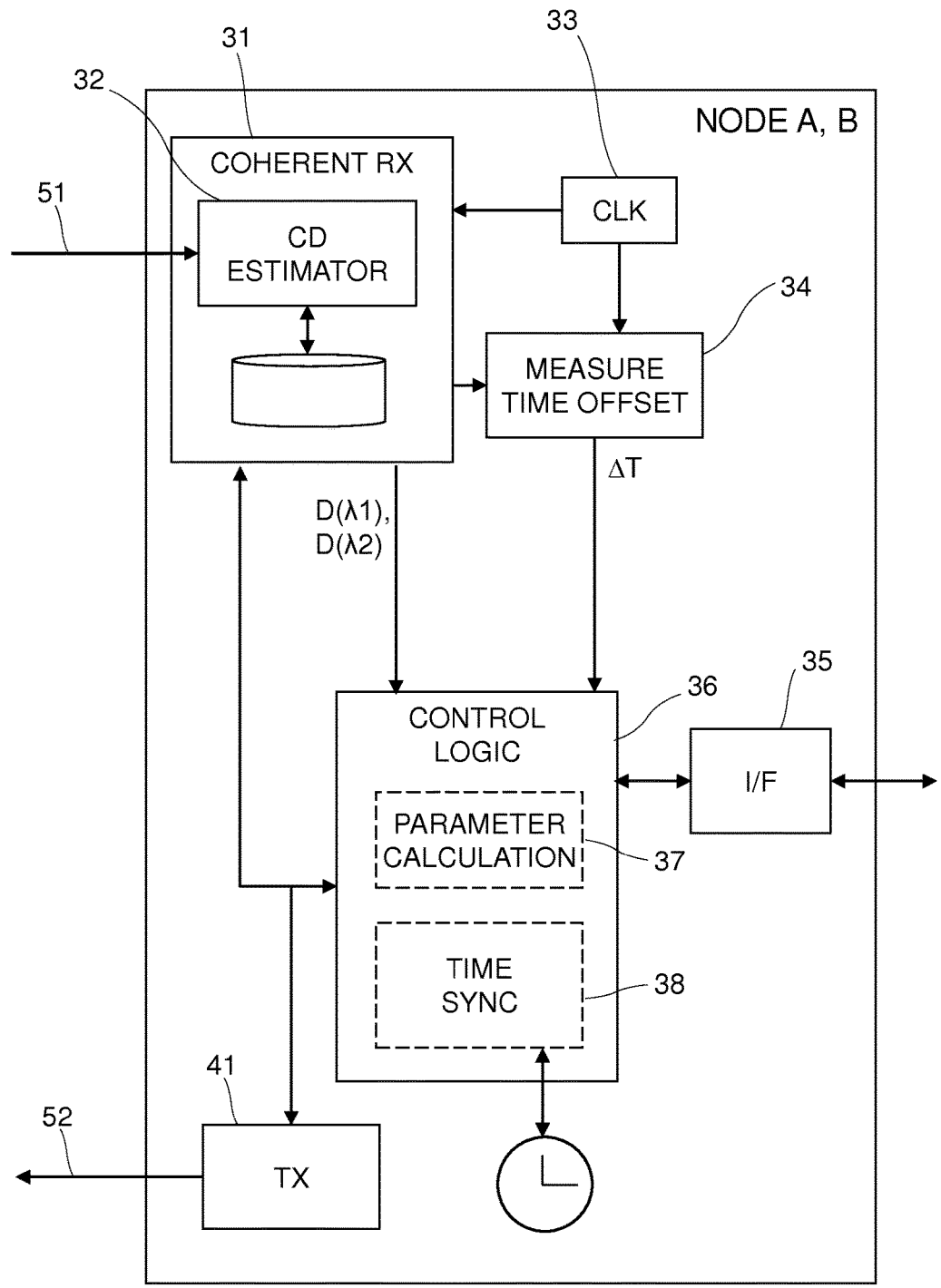
FIG. 9 shows apparatus at a node of the optical communications network.

FIG. 9 shows apparatus provided at one of the nodes A, B. A coherent receiver 31 connects to an incoming optical link 51. The coherent receiver comprises a CD estimator 32. The CD estimator 32 estimates chromatic dispersion of the received signal at a particular wavelength. A clock 33 provides an output to the coherent receiver 31 and to a module 34 for measuring time offset. As explained above, the clock 33 is used to measure the time offset between the arrival of two received signals. Control logic 36 controls operation of the node. In particular, control logic 36 co-ordinates operation of the coherent receiver 31, and module 34 to obtain measurements of a time offset ($\Delta T$) between arrival of two received signals and estimations ($D(\lambda 1)$, $D(\lambda 2)$) of chromatic dispersion at the wavelengths of the two received signals. Control logic 36 can include a parameter calculation nodule, which can be used to calculate an asymmetry parameter, or an intermediate parameter such as the effective length (equation (iii) above) which can be used to obtain an asymmetry parameter. Parameter calculation module 37 can perform any of equations (ii)-(v) above. An interface 35 is provided for allowing the node to communicate with other nodes, such as the NMS 70. The node can forward measurements and/or calculated parameters to other nodes via the interface 35. The node also comprises a transmitter 41, which is connected to the outgoing optical link 52. Control logic 36 controls operation of transmitter 41 to simultaneously generate two signals at different wavelengths, to measure properties of the path between the node and another node in the manner shown in FIG. 4A. The node may perform time synchronisation (e.g. PTP) using time sync logic 38. The node synchronises a local clock with a master clock by exchanging signalling messages with another node. Time sync logic 38 will use an asymmetry parameter calculated 37 locally by the node, or received from another node.

Figure 10:
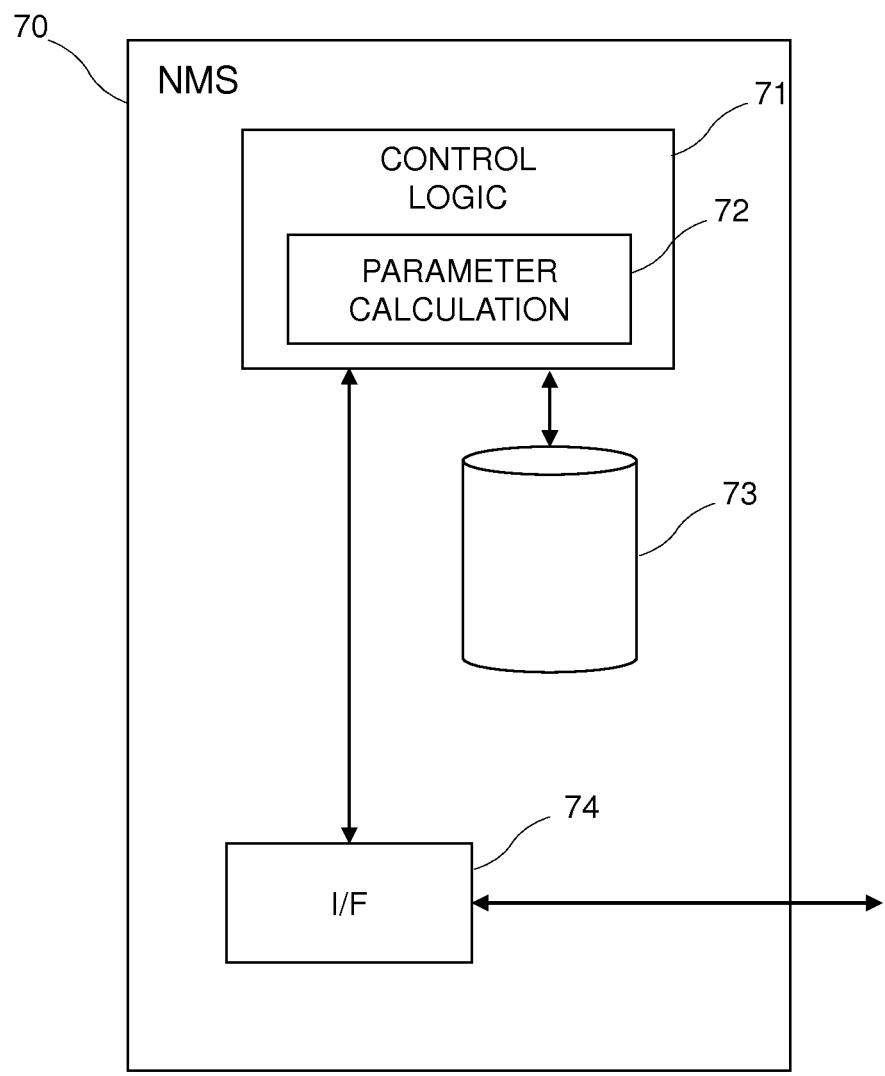
FIG. 10 shows apparatus at an NMS of the optical communications network.

FIG. 10 shows apparatus provided at a NMS 70. Control logic includes a parameter calculation module 72. The parameter calculation nodule 72 can be used to calculate an asymmetry parameter (e.g. equation (v) above), or an intermediate parameter such as the effective length (e.g. equation (iii) above) which can be used to obtain an asymmetry parameter. Parameter calculation module 37 can perform any of equations (ii)-(v) above. Parameters/measurements can be stored in storage 73. An interface 74 is provided for allowing the NMS to communicate with other nodes, such as nodes A, B. The NMS may also communicate with the NMS of another domain, such as a client NMS or an NMS of another operator, and may forward measurements and/or calculated parameters.

Figure 11:
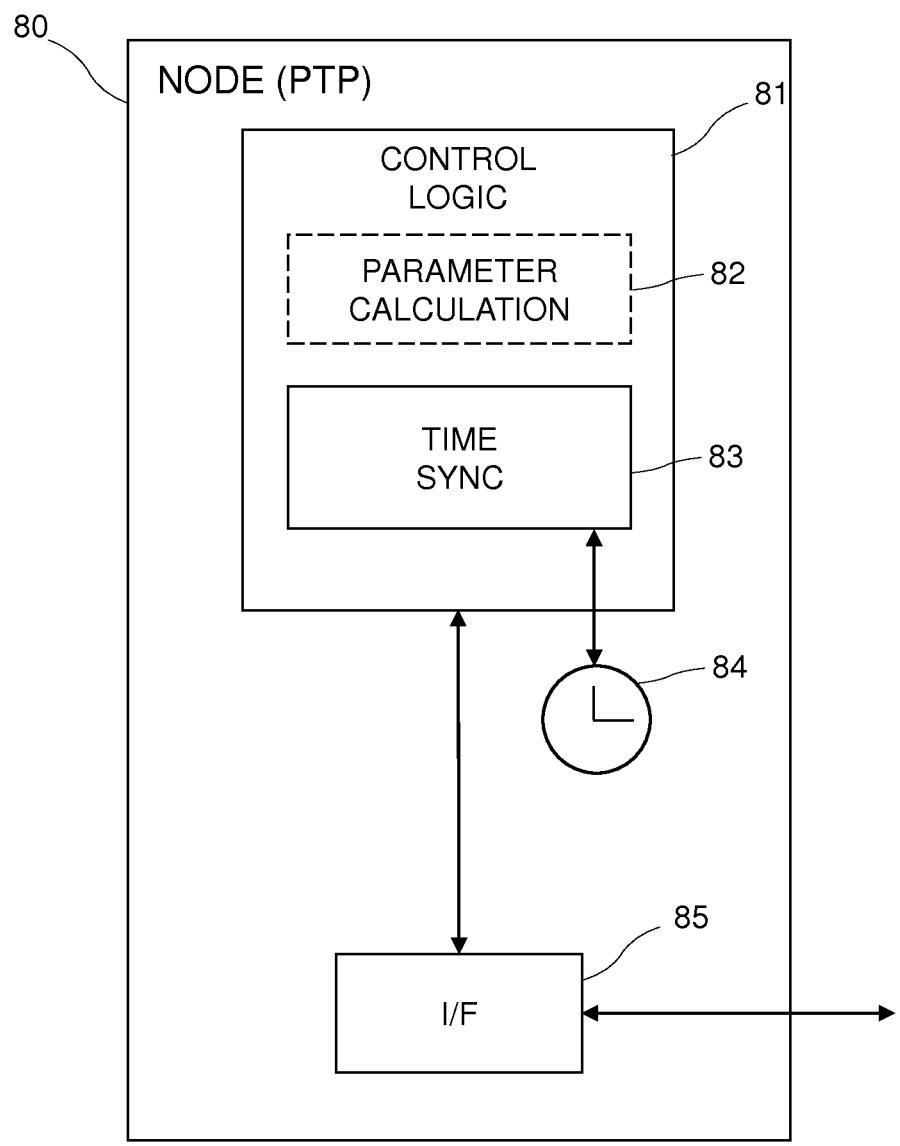
FIG. 11 shows apparatus at a node which performs time synchronisation.

FIG. 11 shows apparatus provided at a slave node 80 which can synchronise with a master node using a time protocol such as PTP. Control logic 81 includes a module 83 which performs time synchronisation. The node synchronises a local clock 84 with a master clock by exchanging signalling messages with another node. Time sync module 83 will use an asymmetry parameter to compensate for an asymmetry between forward and reverse paths between the master node and slave node. The asymmetry parameter may be calculated locally at the node 80 by logic 82, it can be received from another node. Parameter calculation module 82 can perform any of equations (ii)-(v) above. An interface 85 is provided for allowing the node 80 to communicate with other nodes. Interface 85 may be used to receive measurements and/or calculated parameters from other nodes.

Figure 12:
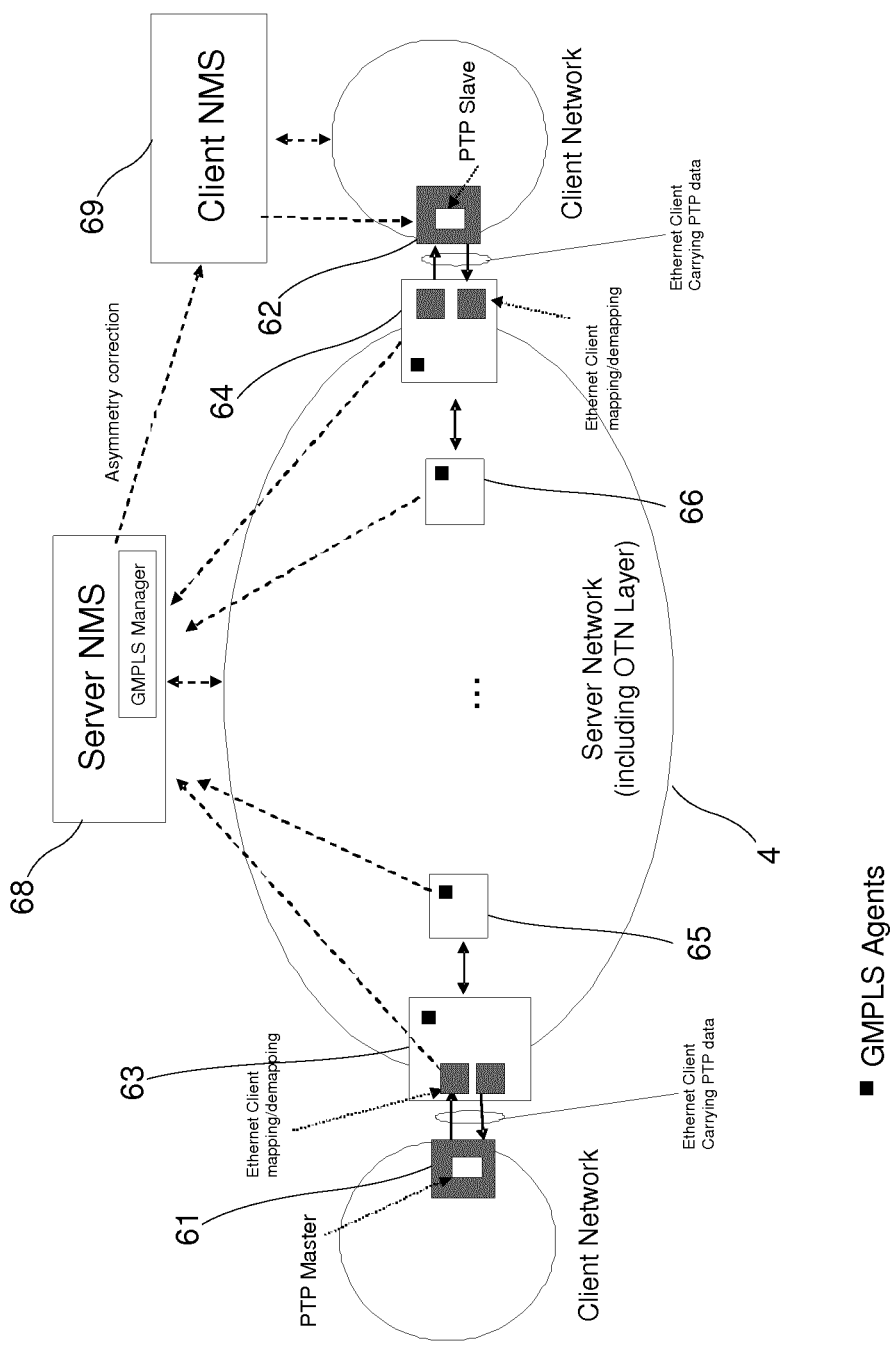
FIGS. 12 and 13 show examples of a communications system comprising a client network and a server communications network.
Figure 13:
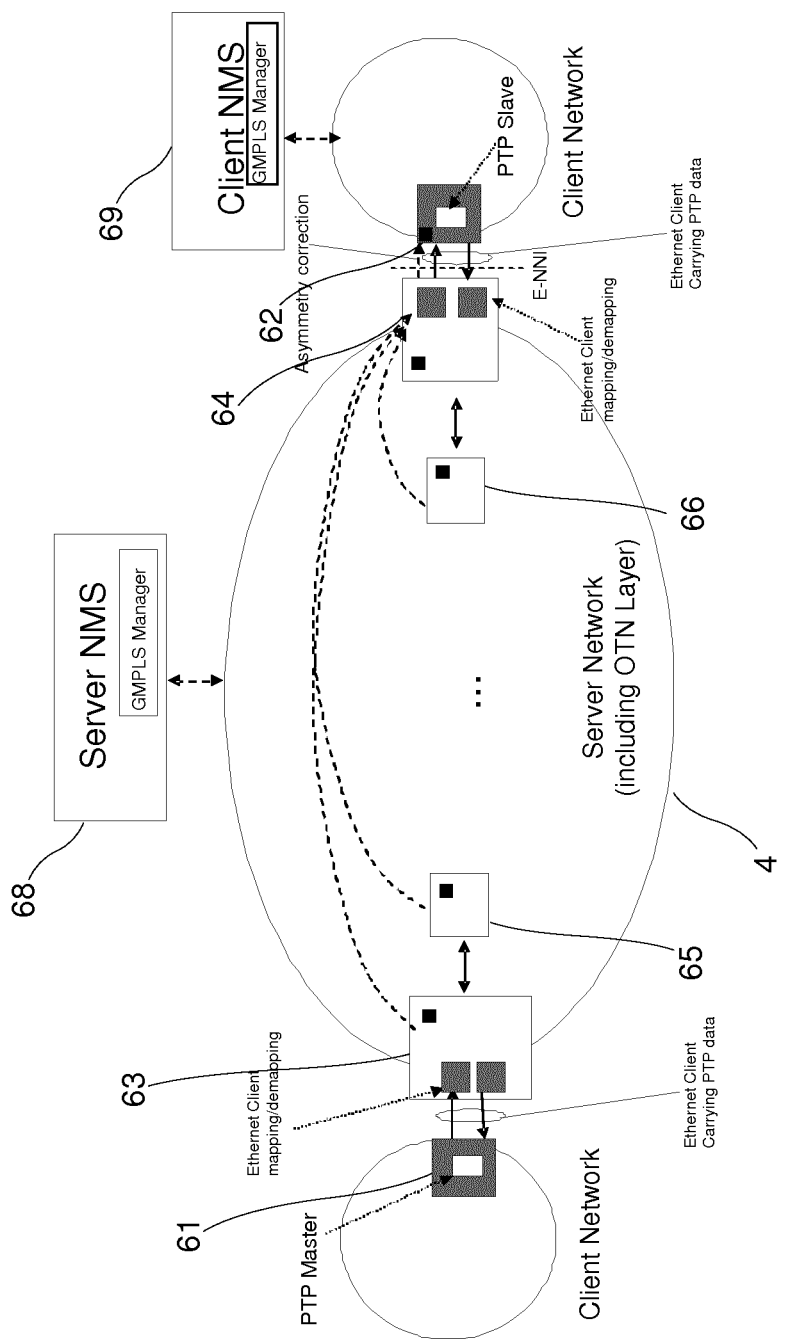

FIGS. 12 and 13 show examples of a communications system comprising a client network, within which both a first client node 61 and a second client node 62 are provided, and a server communications network including an OTN layer, such as the optical communications network 4 previously described. The communications system comprises a server NMS 68 and a client NMS 69. The first client node 61 is coupled to the server network 4 through a first border node 63 of the server network. The first border node 63 is arranged to map client traffic into a form for transmission over the server network. A second border node 64 of the server network connects to the client network. Traffic is carried between border nodes 63, 64 via intermediate nodes 65, 66 of the server network. The intermediate nodes can be the nodes A, B described earlier. In the system of FIG. 12, time synchronisation can be performed between a master clock at the first client node 61 and a slave clock at the second client node 62 across the server communications network 4. An asymmetry is calculated between the forward and reverse directions of the overall paths between client nodes 61 and 62. The asymmetry can include delays due to: mapping traffic at nodes 63, 64; performing Forward Error Correction (FEC); propagation delays across the server network. The measurements performed at nodes of the optical communications network 4 are used to calculate an overall asymmetry between a pair of nodes involved in a timing synchronisation operation. Measurements performed by nodes 63, 64, 65, 66, or parameter values calculated by nodes 63, 64, 65, 66 based on measurements, are forwarded to other nodes which may require those measurements/parameter values. In FIG. 12, nodes 65, 66 forward measurements/parameter values to the server NMS. A message of a protocol such as Open Shortest Path First-Traffic Engineering (OSPF-TE) can be used to carry the measurements/parameter values. An asymmetry parameter can be calculated by the server NMS, using the measurements/parameter values received from nodes 63, 64, 65, 66. The server NMS 68 can communicate with a client NMS 69. The server NMS 68 can provide a calculated asymmetry parameter to the client NMS 69 (e.g. an asymmetry parameter for the path between border nodes), or it can provide measurements to the client NMS, to allow the client NMS to calculate an asymmetry parameter for the overall path between a particular pair of client nodes.

FIG. 13 shows another system comprising a client network and a server communications network including an OTN layer, such as the optical communications network 4 previously described. In this system, nodes 63, 64, 65, 66 of the server network forward measurements/parameter values to border node 64, and border node 64 re-distributes the measurements/parameter values to the second client node 62. The second client node 62 can calculate the asymmetry based on the measurements/parameter values received from the border node 64.

Figure 14:
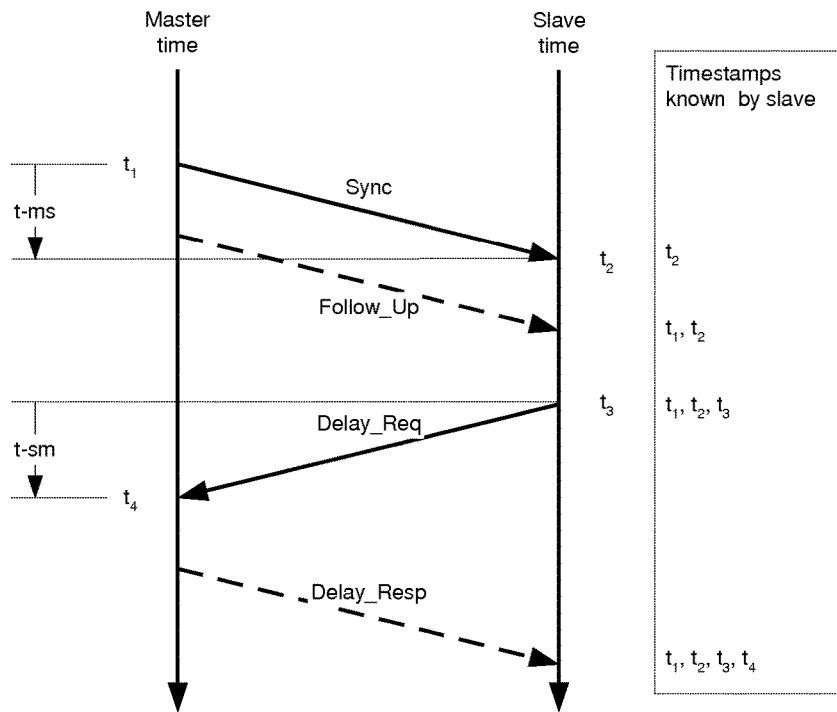
FIG. 14 shows a message exchange for time synchronisation protocol according to PTP.

FIG. 14 shows an example of a message exchange according to the PTP protocol for synchronizing a slave clock with a master clock. The message exchange pattern is:

The master sends a Sync message to the slave and notes the time, t1, at which it was sent.

The slave receives the Sync message and notes the time of reception, t2.

The master conveys to the slave the timestamp t1 by embedding the timestamp t1 in the Sync message. This requires some sort of hardware processing for highest accuracy and precision. Alternatively, the master can embed the timestamp t1 in a Follow_Up message.

The slave sends a Delay_Req message to the master and notes the time, t3, at which it was sent.

The master receives the Delay_Req message and notes the time of reception, t4.

The master conveys to the slave the timestamp t4 by embedding it in a Delay_Resp message.

At the conclusion of this exchange of messages, the slave possesses all four timestamps: t1, t2, t3, t4. These timestamps may be used to compute the offset of the slave's clock with respect to the master and the mean propagation time of messages between the two clocks, which in FIG. 14 is the mean of t-ms and t-sm. The slave shall synchronise to its master via the minimisation of the <offsetFromMaster> value computed by the slave.

The time error between a slave and master ordinary or boundary clock (<offsetFromMaster>) is defined as: <offsetFromMaster>=<Time on the slave clock>−<Time on the master clock> where all times are measured at the same instant. In particular, the <offsetFromMaster> value shall be computed by the slave as follows:

If a Follow_Up message will not be received, then <offsetFromMaster>=(t2−t1)−<meanPathDelay>−correctionField of Sync message.

If a Follow_Up message will be received, then <offsetFromMaster>=(t2−t1)−<meanPathDelay>−correctionField of Sync message−correctionField of Follow_Up message where correction field of Sync message relates to the support in the transport network (i.e. Transparent Clocks adding information on the latency for the packet crossing the transport network element).

The nominal value of the <meanPathDelay> is computed as $$<\text{meanPathDelay}>=[(t_2-t_1)+(t_4-t_3)]/2=[(t_2-t_3)+(t_4-t_1)]/2$$

The scheme is slightly different in case of Peer-to-Peer Transparent clocks where the Path delay is calculated at each hop and included in the correction field of the sync message (or Follow-up message in case of 2-steps clock) in addition to the latency. From the above description it is clear that the computation of offset and propagation time assumes that the master-to-slave and slave-to-master propagation times are equal. Any asymmetry in propagation time introduces an error in the computed value of the clock offset. The computed mean propagation time differs from the actual propagation times due to the asymmetry.

If the delay Asymmetry of the path connected to the ingress port is known, the corrections can be made as specified by the PTP protocol (see section 11.6 of IEEE 1588-2008, IEEE Standard for a Precision Clock Synchronization Protocol for Network Measurement and Control System). In particular, IEEE 1588 defines the attribute "delayAsymmetry" as follows (see 7.4 in IEEE 1588); for t-ms and t-sm definitions:

$$\text{tms}=<\text{meanPathDelay}>+\text{delayAsymmetry}$$

$$\text{tsm}=<\text{meanPathDelay}>-\text{delayAsymmetry}$$

In other words, delayAsymmetry is defined to be positive when the master-to-slave or responder-to requestor propagation time is longer than the slave-to-master or requestor-to-responder propagation time. The methods and apparatus described above allow the asymmetry to be calculated and therefore the term "delayAsymmetry" can include the asymmetry calculated between forward and reverse paths of the optical communications network.

Dispersion Estimation

Chromatic dispersion (CD) is one of the most important linear distortions that affect the performance of optical systems. In traditional not-coherent receivers, that employ direct detection, the phase of the optical E-field is lost, making exact equalisation of the channel by a linear filter impossible. Coherent detection circumvents this problem by combining the received signal with a local oscillator (LO) laser and by using balanced detection to down-convert it into a baseband electrical output that is proportional to the optical E-field. The resulting signal can then be sampled and processed by digital signal processing (DSP) algorithms, providing a flexible, software based, platform that is an attractive alternative to the traditional optical CD compensation done using Dispersion Compensation Fibres (DCF).

Existing devices can digitally compensate CD and can measure, with a high accuracy level, the dispersion parameter D at the different transmission frequencies. An example of D estimation is reported in JOURNAL OF LIGHTWAVE TECHNOLOGY, VOL. 27, NO. 16, Aug. 15, 2009—DSP for Coherent Single-Carrier Receivers, page 3, par. B. Here is proposed a receiver where, given a theoretical "preloaded CD value", the receiver must is able to estimate the CD at system start up and continuously monitor it during transmission. This estimated value is referred to the carrier wavelength. In general the D parameter is wavelength dependent even if, in common used fibres, it is assumed constant at least on the C band and on the L band. The minimum of J|CD| parameter on Y axis of FIG. 15 indicates the correct value of chromatic dispersion. After a rough scan with the dispersion values around the minimum can be scanned at a higher resolution improving the estimation precision.

Determination of properties (length, propagation delay) between a pair of nodes has various possible applications. One important application described in detail is determining asymmetry in propagation delay between the pair of nodes, for use in time synchronisation. Another application is aligning propagation delay of superchannels. For example, 1 Terabit channels can be built by combining fibre sub carriers at 200 Gbit/s each. Each sub carrier can, in theory, follow a different optical path (e.g. across a mesh) and combine with the other sub carriers at the destination node. Advantageously, these optical paths (all having same source and destination nodes) should have a differential propagation delay not greater than a maximum value. In this scenario, it could be useful to have an estimation of the propagation delay for each sub carrier (for example, during the routing phase). The method described above can be applied to the path used by a first sub carrier, and then repeated for the path used by each additional sub carrier. A propagation delay is calculated for each sub carrier. This can use steps 101-106 of FIG. 5. The set of propagation delays obtained in this way can be analysed, checking that the difference between the longest propagation delay and shortest propagation delay fall within a required threshold limit.

One upcoming architectural change in mobile access network is the possibility to split conventional Radio Base Stations (RBS) in two parts: a Processing Main Unit (MU) and a set of antennas with dedicated RF equipment able to cover multiple radio cells (RRUs). A single MU is shared among multiple RRUs. This new architectural approach in the RBS implementation require high capacity, cost effective and low latency transport systems between MU (processing) and RRUs (antennas). Nowadays they are realized through the standard protocol CPRI, transmitted over P2P dedicated optical links. CPRI has pressing constraints in terms of latency and in particular in terms of uplink/downlink differential delay. Using WDM technologies as a transmission layer for CPRI could provide great benefits, in terms of efficient use of fibre and MU consolidation. As a drawback, compared with dedicated P2P fibre, accommodating uplink and downlink streams on different fibres and/or wavelengths can have a detrimental effect on the CPRI synchronisation. That effect increases with the length of the link(s), with the difference between the lengths of the two fibres (in case of two fibre systems) and with the wavelength spacing between uplink and downlink wavelengths. The knowledge of uplink and downlink propagation delay differences can be used to apply the proper compensation on the two CPRI streams so that the differential delay is reduced to less than an acceptable threshold value.

Figure 16:
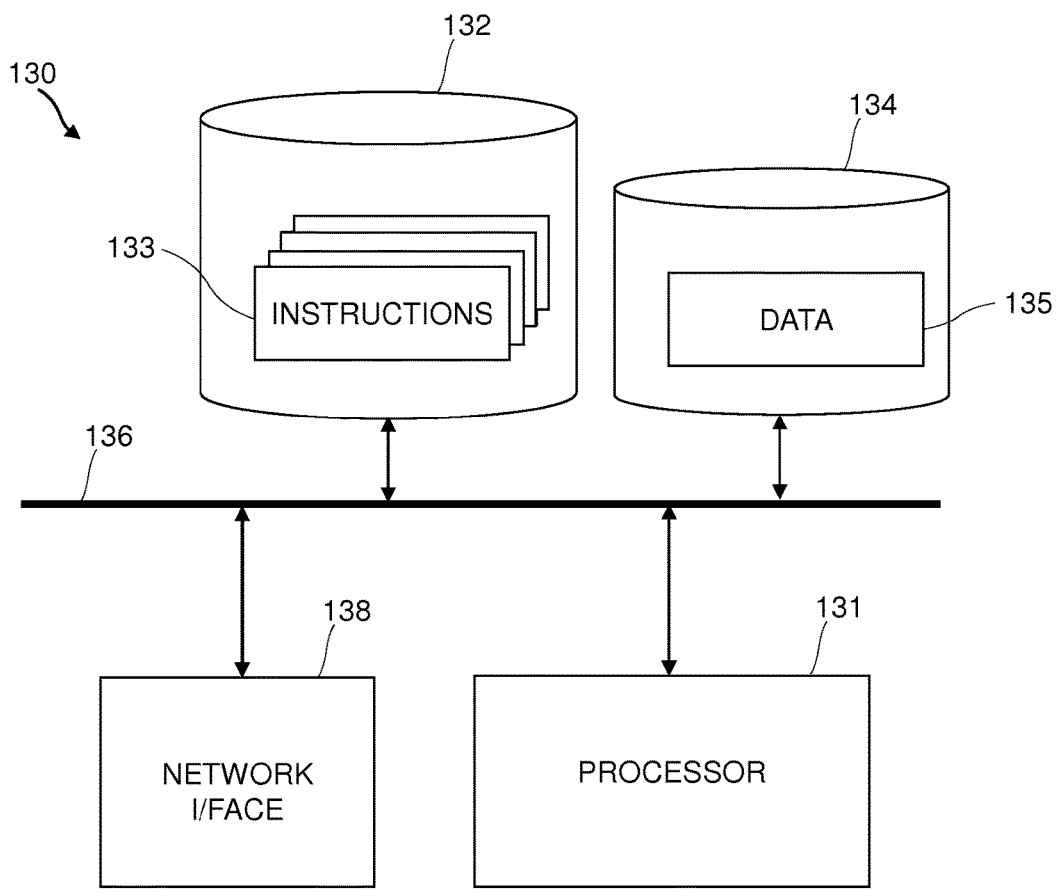
FIG. 16 shows processing apparatus for performing a computer-based implementation of the method.

FIG. 16 shows an exemplary processing apparatus 130 which may be implemented as any form of a computing and/or electronic device, and in which embodiments of the system and methods described above may be implemented. Processing apparatus 130 can be provided at one of the nodes 10, or at a node 70 forming part of the network management system. Processing apparatus may implement the method shown in any of FIGS. 5 to 8. Processing apparatus 130 comprises one or more processors 131 which may be microprocessors, controllers or any other suitable type of processors for executing instructions to control the operation of the device. The processor 131 is connected to other components of the device via one or more buses 136. Processor-executable instructions 133 may be provided using any computer-readable media, such as memory 132. The processor-executable instructions 133 can comprise instructions for implementing the functionality of the described methods. The memory 132 is of any suitable type such as read-only memory (ROM), random access memory (RAM), a storage device of any type such as a magnetic or optical storage device. Additional memory 134 can be provided to store data 135 used by the processor 131. The processing apparatus 130 comprises one or more network interfaces 138 for interfacing with other network entities, such as other nodes 10 of the network 4.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of determining properties of an optical communications path between a first optical network node and a second optical network node, the method comprising:
   determining, at the second optical network node, a time difference between respective first and second optical test signals received on different wavelengths from the first optical network node;
   determining, at the second optical network node, a real-time chromatic dispersion parameter for each of the wavelengths using a respective coherent receiver at the second optical network node; and
   determining an asymmetry parameter that characterizes a timing difference between forward and reverse paths of the optical communications path between the first optical network node and the second optical network node by using the determined time difference and the determined real-time chromatic dispersion parameters to determine a length of the optical communications path.

2. A method according to claim 1 wherein the step of determining a real-time chromatic dispersion parameter comprises, for each wavelength, determining chromatic dispersion at a plurality of values and finding convergence to a final value.

3. A method according to claim 2 wherein the step of determining a real-time chromatic dispersion parameter begins at a stored value of chromatic dispersion.

4. A method according to claim 1 comprising determining a length of the optical communications path in a transmission direction from the first optical network node to the second optical network node using the determined time offset and the chromatic dispersion parameters.

5. A method according to claim 1 wherein, if the optical communications path is a common physical path for a transmission direction between the first optical network node and the second optical network node and a transmission direction between the second optical network node and the first optical network node, the step of determining an asymmetry parameter comprises determining an asymmetry parameter for the optical communications path for a wavelength in a transmission direction between the first optical network node and the second optical network node and a wavelength in a transmission direction between the second optical network node and the first optical network node.

6. A method according to claim 1 wherein, if the optical communications path comprises a first path in a transmission direction from the first optical network node to the second optical network node and a second path in a transmission direction from the second optical network node and the first optical network node, wherein the first path is different to the second path, the method further comprises:
sending optical test signals at different wavelengths from the second optical network node to the first optical network node over the second path.

7. A method according to claim 6 further comprising:
determining, at the first optical network node, a time difference between respective first and second optical test signals received on different wavelengths from the second optical network node; and
determining, at the first optical network node, a real-time chromatic dispersion parameter for each wavelength using a respective coherent receiver at the first optical network node.

8. A method according to claim 7 wherein the step of determining an asymmetry parameter uses the determined time difference and real-time chromatic dispersion parameters determined by the first optical network node.

9. A method according to claim 8 wherein the step of determining an asymmetry parameter comprises determining a length of the optical communications path in a transmission direction from the second optical network node to the first optical network node using the determined time offset and the chromatic dispersion parameters determined by the first optical network node.

10. A method according to claim 8 wherein the step of determining an asymmetry parameter comprises determining an asymmetry parameter for the optical communications path for a wavelength in a transmission direction between the first optical network node and the second optical network node and a wavelength in a transmission direction between the second optical network node and the first optical network node.

11. A method according to claim 1 wherein the step of determining an asymmetry parameter for an optical communications path is performed at a remote node, other than the first optical network node and the second optical network node.

12. A method according to claim 11 wherein the remote node is one of: a Network Management System and a node participating in time synchronisation.

13. The method of claim 1, comprising:
performing time synchronisation between a master clock at the first optical network node and a slave clock at the second optical network node across an optical communications network by, at the second optical network node, performing a method comprising:
using a time protocol to synchronise the slave clock with the master clock using forward and reverse communications between the second optical network node and the first optical network node; and
compensating for an asymmetry between the forward and reverse communications using the asymmetry parameter.

14. A method of determining properties of an optical communications path between a first optical network node and a second optical network node, the method comprising, at a network management entity:
causing the second optical network node to determine a time difference between respective first and second optical test signals received on different wavelengths from the first optical network node; and
causing the second optical network node to determine a real-time chromatic dispersion parameter for each of the wavelengths using a respective coherent receiver at the second optical network node; and
determining an asymmetry parameter that characterizes a timing difference between forward and reverse paths of the optical communications path between the first optical network node and the second optical network node by using the determined time difference and the determined real-time chromatic dispersion to determine a length of the optical communications path.

15. Apparatus at a second optical network node for determining properties of an optical communication path between a first optical network node and the second optical network node comprising:
a time offset measuring module arranged to determine a time difference between respective first and second optical test signals received on different wavelengths from the first optical network node;
a dispersion measuring module arranged to determine a real-time chromatic dispersion parameter for each of the wavelengths using a respective coherent receiver at the second optical network node; and
control logic arranged to determine an asymmetry parameter that characterizes a timing difference between forward and reverse paths of the optical communications path between the first optical network node and the second optical network node by using the determined time difference and the determined real-time chromatic dispersion parameters to determine a length of the optical communications path.

16. Apparatus for use at a network management entity of an optical communication network for determining properties of an optical communication path between a first optical network node and a second optical network node of the network comprising:
an interface for communicating with the optical network nodes; and
control logic which is arranged to:
cause the second optical network node to determine a time difference between respective first and second optical test signals received on different wavelengths from the first optical network node;
cause the second optical network node to determine a real-time chromatic dispersion parameter for each of the wavelengths using a respective coherent receiver at the second optical network node; and
determine an asymmetry parameter that characterizes a timing difference between forward and reverse paths of the optical communications path between the first optical network node and the second optical network node by using the determined time difference and real-time chromatic dispersion parameters to determine a length of the optical communications path.

17. A non-transitory machine-readable storage medium carrying instructions which, when executed by a processor, cause the processor to perform a method of determining properties of an optical communications path between a first optical network node and a second optical network node, the method comprising:

determining, at the second optical network node, a time difference between respective first and second optical test signals received on different wavelengths from the first optical network node;

determining, at the second optical network node, a real-time chromatic dispersion parameter for each of the wavelengths using a respective coherent receiver at the second optical network node; and determining an asymmetry parameter that characterizes a timing difference between forward and reverse paths of the optical communications path between the first optical network node and the second optical network node by using the determined time difference and the determined real-time chromatic dispersion parameters to determine a length of the optical communications path.

18. A non-transitory machine-readable storage medium carrying instructions which, when executed by a processor, cause the processor to perform a method of determining properties of an optical communications path between a first optical network node and a second optical network node, the method comprising, at a network management entity:

causing the second optical network node to determine a time difference between respective first and second optical test signals received on different wavelengths from the first optical network node;

causing the second optical network node to determine a real-time chromatic dispersion parameter for each of the wavelengths using a respective coherent receiver at the second optical network node; and causing the second optical network node to determine an asymmetry parameter that characterizes a timing difference between forward and reverse paths of the optical communications path between the first optical network node and the second optical network node by using the determined time difference and the determined real-time chromatic dispersion parameters to determine a length of the optical communications path.

* * * * *